US008172494B1

(12) United States Patent
Knox

(10) Patent No.: US 8,172,494 B1
(45) Date of Patent: May 8, 2012

(54) ADJUSTABLE DECKING SYSTEM FOR SUPPORTING FREIGHT

(75) Inventor: Howard T. Knox, Independence, KY (US)

(73) Assignee: Ancra International, LLC, Hawthorne, CA (US)

( * ) Notice: Subject to any disclaimer, the term of this patent is extended or adjusted under 35 U.S.C. 154(b) by 141 days.

(21) Appl. No.: 12/661,683

(22) Filed: Mar. 23, 2010

(51) Int. Cl.
*B60P 7/00* (2006.01)
(52) U.S. Cl. .......... 410/89; 410/143; 410/145; 410/146; 410/148; 410/149; 410/150
(58) Field of Classification Search .................. 410/46, 410/89, 129, 143–150; 248/354.1; 211/191, 211/192, 105.3, 208; 105/370
See application file for complete search history.

(56) References Cited

U.S. PATENT DOCUMENTS

| | | | |
|---|---|---|---|
| 3,071,086 A | 1/1963 | Dunlap | |
| 3,090,329 A | 5/1963 | Rolfe, Jr. | |
| 3,095,830 A | 7/1963 | Runken | |
| 3,116,702 A | 1/1964 | Stough | |
| 5,338,137 A | 8/1994 | Jensen | |
| 5,387,064 A * | 2/1995 | Cardinal | ................ 410/89 |
| 5,452,972 A | 9/1995 | Adams | |
| 6,074,143 A | 6/2000 | Langston et al. | |
| 6,364,583 B1 | 4/2002 | Koller | |
| 6,722,829 B2 | 4/2004 | Williams | |
| 6,739,811 B1 | 5/2004 | Petelka | |
| 6,824,341 B2 | 11/2004 | Ehrlich | |
| 6,840,725 B2 | 1/2005 | Moore | |
| 7,037,055 B1 | 5/2006 | Rogers et al. | |
| 7,350,468 B2 | 4/2008 | Gatto et al. | |
| 7,648,318 B2 | 1/2010 | Maresh et al. | |

* cited by examiner

*Primary Examiner* — Stephen Gordon
(74) *Attorney, Agent, or Firm* — Wood, Phillips, Katz, Clark & Mortimer

(57) ABSTRACT

A beam assembly is formed from a hollow beam member which has a pair of slidable channel units installed therein and extend from the opposite ends thereof. The ends of the channel units have guide shoes forming latching assemblies pivotally supported thereon, each guide shoe having a spring loaded lock key mounted pivotally mounted thereon. A pair of tracks are spaced from each other in opposing relationship by a distance equal to the longitudinal extent of the beam member. The tracks have a plurality of aligned apertures and C-shaped runners running along their longitudinal extent. The lock keys of the beam member each has a pair of latching fingers extending therefrom which fit into a pair of adjacent track apertures. The latching fingers may be locked in place in the opposing track apertures by the spring action of their associated springs and may be withdrawn from the apertures by way of a hook shaped tab attached thereon. A tool is provided to move the hook shaped tabs away from the track to release the latching fingers from engagement with the apertures in the track and, is desired to move the hook shaped tabs downwardly to move the guide shoes downwardly to a desired location on the track. The guide shoes further have T-shaped portions which engage the C-shaped runners of the tracks to retain the guide shoes on the tracks for vertical movement. A pair of the beam members may thus be raised and lowered on the track and provide support for pallets, planking or the like.

13 Claims, 10 Drawing Sheets

ADJUSTABLE DECKING SYSTEM FOR SUPPORTING FREIGHT

BACKGROUND OF THE INVENTION

1. Field of the Invention

This invention relates to decking systems in which the deck height can be adjusted and more particularly to such a system for use in supporting freight in a vehicle compartment and to improved method and apparatus for adjusting the deck height.

2. Description of the Prior Art

In vehicles employed for handling freight such as trucks, aircraft and railroad cars, it is often desirable to provide beams, decks, or shelves to support various cargo items. In order to facilitate loading and unloading of such cargo, it is desirable that such cargo support systems be versatile in their positioning and readily relocated from the cargo handling area to a stowage location if need be. In U.S. Pat. No. 5,338,137, inventor: Richard H. Jensen, issued Aug. 16, 1994 and assigned to Ancra International, LLC, the assignee of the present application, a decking system is described which employs paired beams for supporting a shelf or for directly supporting cargo containers. In this system, the height of the deck can be raised or lowered by means of latching members which engage apertures formed in opposing vertically support tracks.

In U.S. Pat. No. 6,074,143, inventors Francis J. Langston and Ward C. Burroughs, issued Jun. 13, 2000, assigned to Ancra International, LLC, there is described an improvement over this prior art decking system of U.S. Pat. No. 5,338,137 in that it provides dual latching fingers on lock keys that are pivotally mounted on guide shoes and the guide shoes can move upwardly and downwardly on the opposed tracks to thereby raise and lower the height of the decking system. The latching fingers engage a pair of apertures in the tracks, thus distributing the load and providing greater strength. A biasing spring provides a force to bias the lock keys towards the track and the latching fingers into engagement in the apertures. The lock keys are provided with tabs to allow manipulation of the latching fingers of the lock keys into and out of apertures in the tracks to provide for the height adjustment of the guide shoes on the track.

When not in use as shelf supports, the guide shoes are generally stored at or near the ceiling or roof of the freight container, such as a cargo vehicle, in which the decking system is used. When it is desired to move the guide shoes to a new height, the guide shoes must be moved downwardly on the track.

When the track, the guide shoes and the lock keys are relatively new and clean, manual manipulation force on the tabs on the lock keys to remove and hold the latching fingers out of engagement with the apertures in the track against the force of the biasing spring is easily done by a person's thumb or finger pressing on the tab to provide a minimum manual force exerted on the tab. Gravity then provides sufficient force on the guide shoes to allow the guide shoes to move downwardly to a desired height while the latching fingers are out of engagement with the apertures. The minimum manual force exerted by the person's thumb or finger on the tab is then removed and the latching fingers re-engage into the apertures of the track under the force of the biasing spring.

In some applications of the invention described in U.S. Pat. No. 6,074,143, it has been found that wear over extended time periods of use and/or in gritty or corrosive environments the guide shoes may not move freely on the tracks and/or the latching fingers may not easily be released from the apertures in the track by the minimum manual force exerted by a person's thumb or finger when it is desired to adjust the height of the guide shoes to thereby adjust the height of the shelving and gravity forces are not strong enough to move guide shoes downwardly to a desired height. In some prior art applications for these conditions, pry bars have been utilized to move the latching fingers out of engagement in the apertures in the track but gravity alone has not been sufficient to caus the guide shoes to move downwardly to a selected height.

SUMMARY OF THE INVENTION

The present invention provides an improved configuration for use in a system generally similar to the structure of the system described in U.S. Pat. No. 6,074,143. The improved configuration provides an improved design of the tab on the lock keys to allow more forceful manipulation thereon than the manual manipulation minimum force by a person's thumb or finger to release the latching fingers from engagement in the apertures and also provide a downward force on the tab to move the guide shoes to the desired height for the shelving. A specially configured tool for the manipulation of the tab on the lock keys is provided. The specifically configured tool, according to the principals of the present invention, is one that has been hereto for utilized in some applications in attempts to move the tab on the lock keys so as to release the shoes and thereby allow the structure to move by gravity to the desired height. However, applying a downward force on the guide shoes to move the guide shoes to a new desired location was often not possible due to the design of the tab. By re-configuring the tab, the existing tool may be utilized to both move the tab to release the shoes as well as to apply a downward force thereon. The use of the existing tool saves considerable time and cost in providing a newly designed tool.

As noted above, the structure in which the present invention may be utilized is the structure similar to the structure defined in U.S. Pat. No. 6,074,143. This structure has a beam (assembly formed from a hollow beam member in which a pair of channel units are slidably installed, these channel units extending from the opposite ends of the beam member. A guide shoe is pivotally attached to the ends of each of the channel units, each guide shoe having a spring loaded lock key pivotally supported thereon.

Multiple pairs of tracks are mounted on the opposed side walls of the freight carrying compartment extending in vertical directions on the side walls and each pair of tracks is in an aligned opposed relationship. The tracks have vertical rows of aligned apertures formed therein and running along their vertical extent. The channel units are slidably mounted on the tracks to support the beam in a desired vertical position on the track. The lock key has a pair of latching fingers extending therefrom which fit into a pair of adjacent track apertures. The latching fingers are locked in place in the track apertures by the spring action of a biasing spring which urges the lock keys toward the track. The latching fingers may be withdrawn from the apertures by manipulating a tab on each lock key against the spring action.

The effective length of the beam assembly can be adjusted for optimum fitting of the latching fingers within the apertures of the track by extending or retracting the tube members from or into the beam member. The tracks further have C-shaped portions which engage T-shaped portions of the guide shoes, thereby retaining the beam assembly for slidable vertical positioning along the tracks. A pair of beam members each installed on a separate pair of spaced tracks can thus be used to support, planking, pallets, or the like at selected heights.

Each of the tracks has a side member on each side of the row of apertures and the guide shoes slide on the side members of the track.

According to the principles of the present invention, the tab on the lock keys of the guide shoes is formed in the shape of a hook having the opening thereof facing the track. A tool member is provided for selectively engaging the hook to move the hook pivotally away from the track against the force of a biasing spring to release the latching fingers from the apertures in the track. In the hook engaged position, the tool can also provide a downwardly directed force on the hook shaped tab to move the guide shoes downwardly on the track This allows the guide shoes to move along the track to any desired height. The tool allows exertion of a much greater force on the tab than the manual manipulation minimum force exerted by a person's thumb or finger as previously utilized in the prior art.

The known tool member useful in combination with and as part of the present invention has an elongated handle of any desired length having a head end and a remote end. An engagement member is fixedly connected to the handle at the head end. The engagement member has a mounting portion connected to the handle and a pair of spaced apart side arms. The pair of spaced apart side arms extend from the mounting portion and are angled from the elongated handle to remote tip portions thereof. An outer surface of the pair of spaced apart side arms are in co-planar alignment and regions adjacent the remote tip portions are adapted to slide on the side members of the track when in use. A central tab is provided between the spaced apart side arms and the central tab has a knee portion with a bearing surface extending out of the plane of the outer surfaces of the spaced apart side members in a first direction and a hook engaging end extending out of the plane of the outer surfaces of the spaced apart side members in a second direction opposite the first direction.

In the preferred use of the tool, the latching fingers of the lock keys are in the engaged position in the apertures of the track and the tip of the hook on the lock keys of the guide shoe is spaced a close distance from the track.

In the operation of the present invention, the handle of the tool member is grasped at or near the remote end, or other portion thereof as may be desired. The knee of the central tab portion and/or the outer surface of one of the side arms are placed against the track in regions adjacent the position of the guide shoe. The remote tip portions of the spaced apart side arms of the engagement portion are placed against the side members of the track and the bearing surface of the central tab is also on the side members of the track and the tool is manipulated so that, in one embodiment, the hook engaging end of the central tab slides between the hook and the track. The tool is then rotated on the bearing surface of the central tab towards the track to bring the hook engaging end thereof into the hook. The tool member acts as a lever to provide the increased force on the tab with the length of the elongated handle from the grasping location thereof comprising the force arm, the bearing surface of the central tab providing the fulcrum and the length of the central tab from the bearing surface to the hook engaging end thereof providing the load arm. The force exerted on the hook by the hook engaging end of the central tab moves the hook away from the track and against the biasing spring force and moves the latching fingers out of engagement with apertures. The tool can then be moved downwardly and the downward force exerted on the hook causes the guide shoes to move downwardly to the desired height on the track. The tool may then be manipulated to move the hook engaging end of the central tab out of engagement with the hook and removed from engagement with the track. The hook moves under the force of the biasing spring as exerted on the lock keys towards the track and the latching fingers move into the apertures in the track at the new height.

In other embodiments of the present invention, when the remote ends of the side arms are in regions adjacent the opening of the hook, the tool is manipulated laterally so that one of the remote ends may be moved into the hook, the tool is then manipulate so as to move the remote end of the side arm into the hook and the tool rotated so that the remote end of the side arm enters the hook and a downward force may be applied to the hook Because of the greater length of the side arms as compared with the length of the central tab, the hook may be moved further away from the track.

In another embodiment of the present invention, a pair of parallel tracks are mounted in close proximity to each other in opposed relationship on the side walls of the container 28 and each of the tracks has the same configuration with the same guide shoes and hooks thereon. In this embodiment, the tool is moved on the tracks until the remote ends of the side arms are aligned, respectively, with one of the hooks. The tool is then manipulated until the remote tips of the side arms are positioned adjacent the hooks. The tool is then manipulated so that one of the remote tips are in each of the hooks and the tool then manipulated as above described to force the hooks away from the track to release the fingers from the apertures and then apply a downward force on the hooks to position the guide shoes at the desired new location on the track.

DESCRIPTION OF THE PREFERRED EMBODIMENTS

Figure 1:
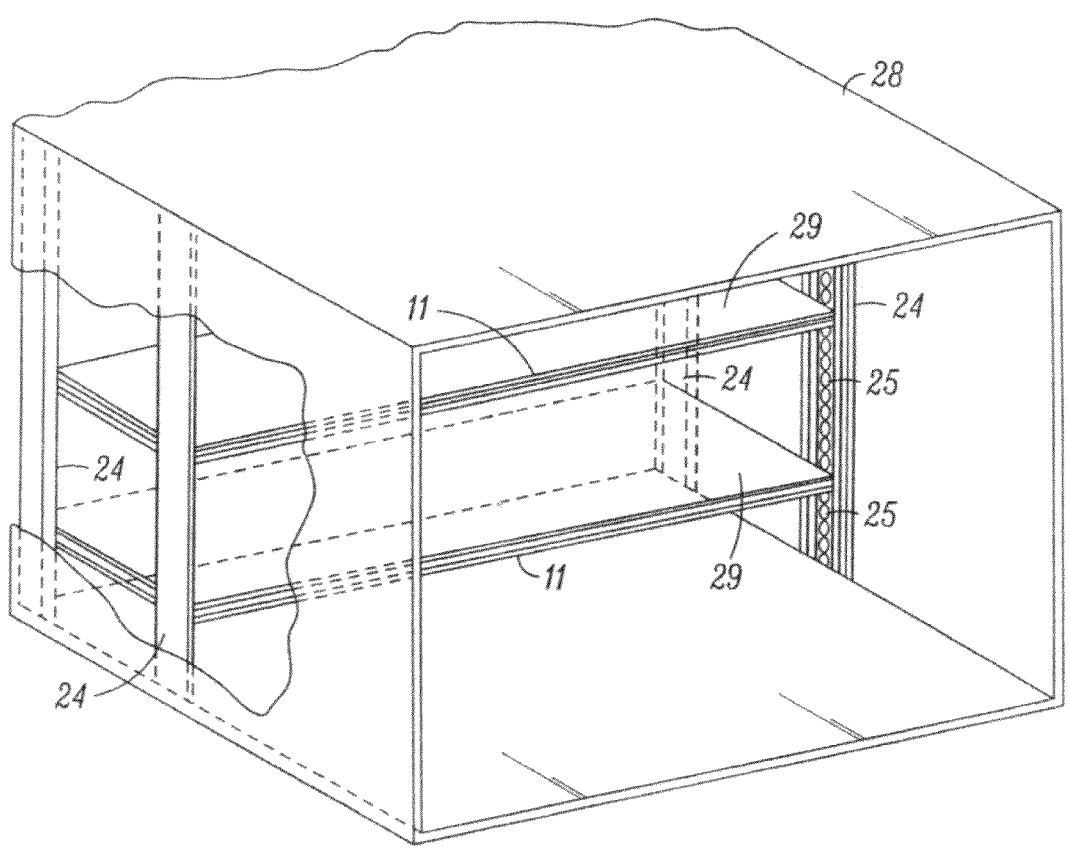
FIG. 1 is a front perspective view showing a typical installation of the system in which the present invention may be advantageously utilized.

Referring now to FIG. 1, there is shown a perspective view of a system in which the present invention may be advantageously utilized. Two pairs of tracks 24 are mounted on the side walls of compartment 28, the tracks of each pair being directly opposite each other. Compartment 28 may be the freight carrying compartment of a vehicle such as a truck. The tracks have spaced openings 25 formed therein, these openings being arranged along the longitudinal extent of the tracks.

Supported between tracks 24 are beam assemblies 11. Such beam assemblies, as to be described in detail further on in the specification, can be adjusted to a desired height in engagement with a pair of opposing tracks 24 at a selected pair of track openings 25. By setting a pair of such beams in the forward and rear tracks at the same height, a support for shelves 29 is provided. If so desired, the shelving can be dispensed with and the beam assemblies used to directly support cargo containers or the like.

Referring now to FIGS. 2-5, beam assembly 11 is formed from a hollow beam member 12 in which a pair of similar slidable channel units 13 and 14 are installed, these channel units extending from the opposite ends of the beam member. Pins 15a and 15b extend between the inner walls of beam member 12, each of the channel units having a slot 13a and 14a in which the pins 15a and 15b are fitted.

Guide shoes 17 and 18 are pivotally supported on the ends of tubes 13 and 14, respectively. Lock keys 19 and 20 are respectively pivotally mounted on guide shoes 17 and 18. Each lock key has a pair of latching fingers 21 and 22 formed thereon. Latching fingers 21 and 22 are circularly shaped to fit into the apertures 25 of track 24. The lock keys 19 and 20 are urged by biasing springs 23, which may be leaf springs, towards the track 24 and resist the pivotal motion thereof away from the track 24. The biasing springs 23 are retained at one end thereof by bearing against the track 24 and at the other end by engagement with the lock keys as indicated at 29 to urge the latching fingers 21 and 22 into an adjacent pair of apertures 25 formed in track 24 in the direction of the arrow 31 shown on FIG. 4. The biasing springs 23 resist pivotal movement of the lock keys 19 on pivot pins 35 away from the track 24 in the direction of the arrow 33 as shown on FIG. 5.

A hook shaped tab 27 is formed on the end of each lock key to enable retraction of the latching fingers 21 and 22 from the track apertures 25 in changing the height of the beam assembly 11. Guide shoes 17 and 18 have T-shaped end portions 17a and 18a which matingly engage C-shaped portions 24a of the track 24 thereby retaining the beam assembly 11 to the tracks 24 for vertical positioning therealong. Stop members (not shown) are installed in tracks 24 to limit the lower extent of the beam assembly 11.

Figure 4:
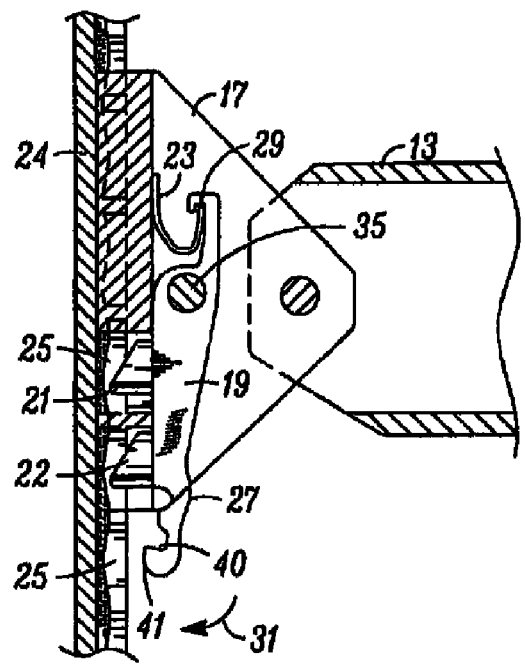
FIG. 4 is a cross sectional taken along the plane indicated by 4-4 in FIG. 2 showing the latching fingers of the lock key in the engagement position with the apertures in the track.
Figure 5:
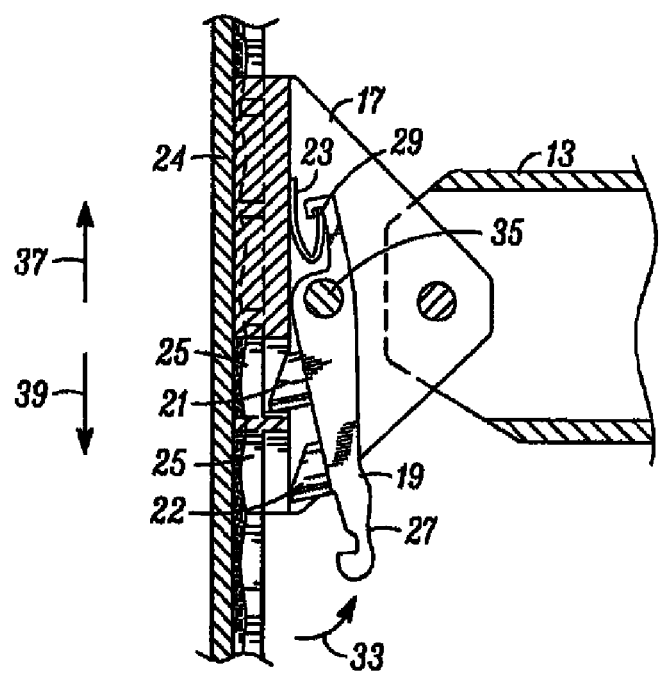
FIG. 5 is a cross sectional view similar to that of FIG. 4 but showing the latching fingers of the lock key in the retracted position out of engagement in the apertures in the track and the tab being manipulated by a manual force.
Figure 6:
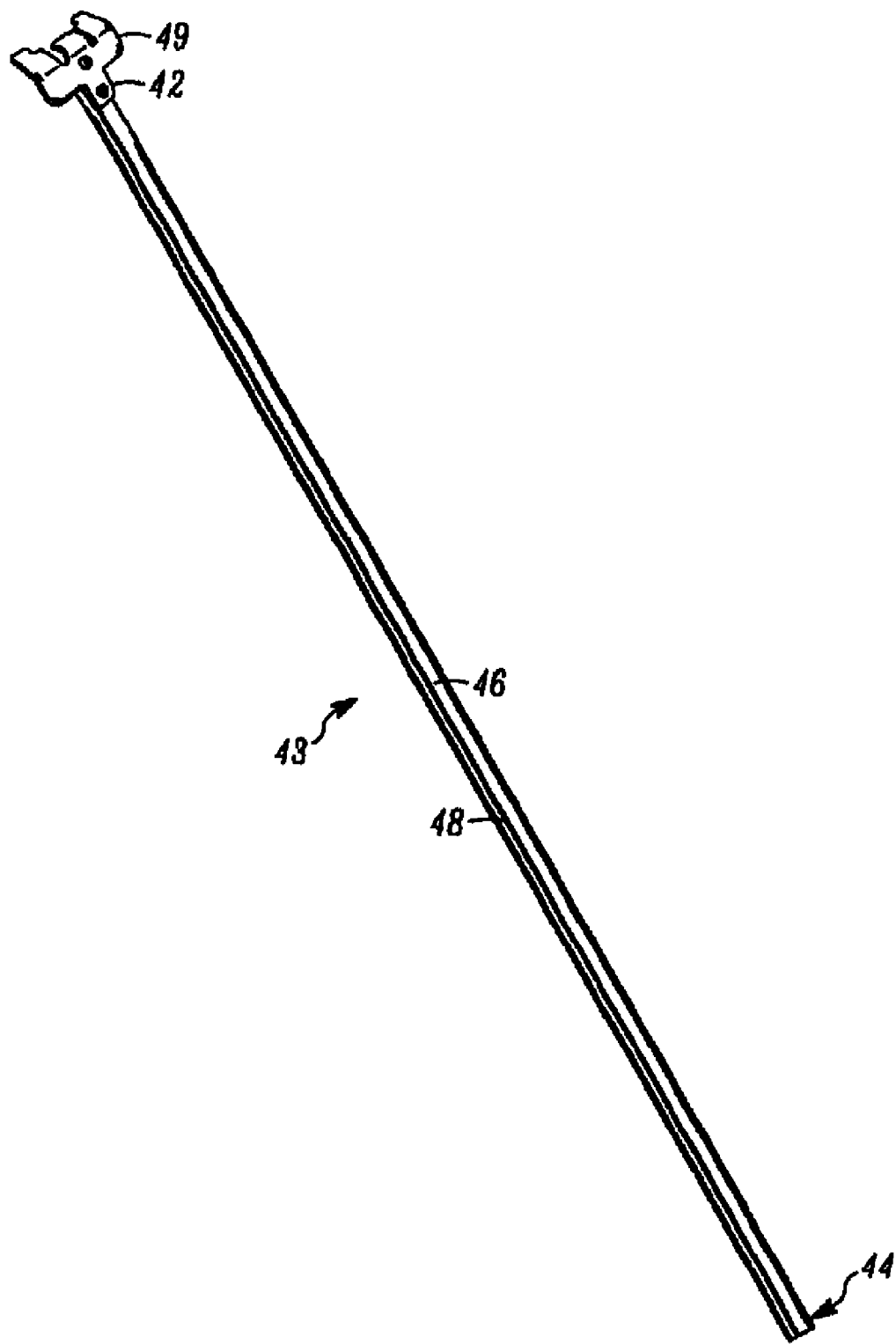
FIG. 6 is a perspective view of a tool useful in the practice of the present invention.

Referring particularly to FIGS. 4 and 5, FIG. 4 shows the lock key 19 in the fully installed position for the positioning of the latching fingers 21 and 22 in the apertures 25 of track 24 by virtue of the biasing spring 23 while FIG. 5 shows the hook shaped tab 27 moved in the direction of the arrow 33 to remove the latching fingers 21 and 22 from the apertures 25 to allow the guide shoes 17 to move upwardly in the direction of the arrow 37 or downwardly in the direction of the arrow 39 to permit vertical positioning of the beam assembly 11 at any desired height.

According to the principles of the present invention, the hook shaped tabs 27, in the installed position shown in FIG. 4, have the open end 40 of the hook shaped tabs 27 facing the track 24 and in close proximity thereto or, if desired for particular applications, the tip portion 41 of the hook shaped tab 17 may touch the track 24. The hook shaped tab 27 is held in the installed position shown in FIG. 4 by the force exerted by the biasing spring 23.

Figure 2:
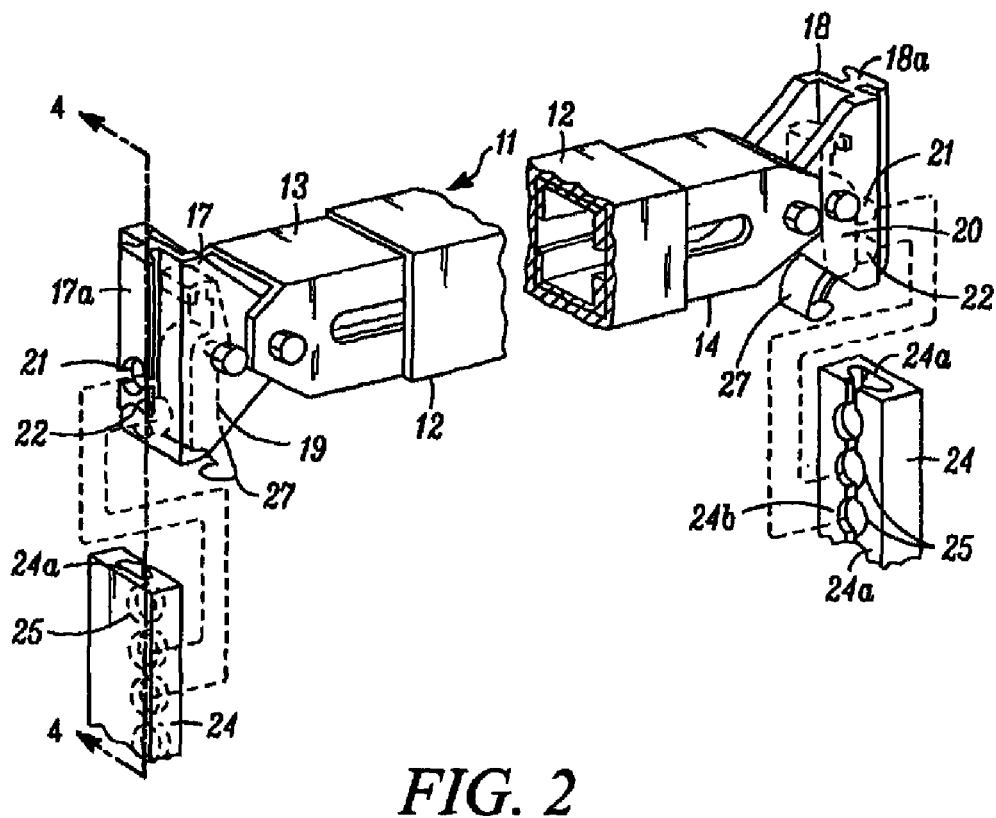
FIG. 2 is a front perspective view of a preferred embodiment of the system in which the present invention may be advantageously utilized
Figure 3:
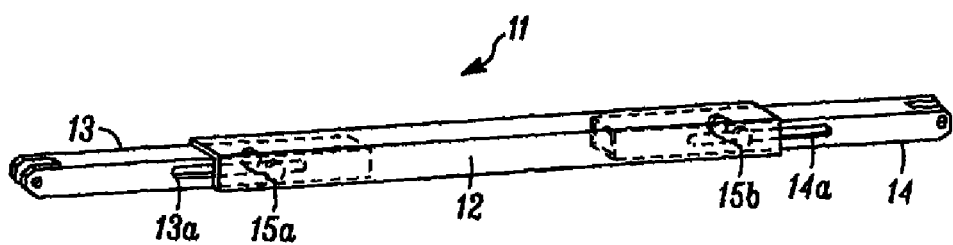
FIG. 3 is a front perspective view of the beam assembly of the preferred embodiment in which the present invention may be advantageously utilized.

FIGS. 1, 2 and 3 illustrate the embodiment of the present invention wherein a single track 24 is installed in apposed relationship on opposite sides of the compartment 28. As noted above, in some embodiments of the present invention, in order to provide additional structural support for the loads, there may be a pair of tracks 24 in close proximity, at each location on the side walls. In such an embodiment, each of the tracks is identical and the operation thereof is identical.

As noted above, in some applications of the present invention, the manual manipulating force that may be exerted by a person's thumb or finger may not be sufficient either to move the hook shaped tab 27 in the direction of the arrow 33 to move the latching fingers 21 and 22 out of engagement with the apertures 25 or move the guide shoe 17 downwardly in the direction of the arrow 39 due to excessive wear, operation in corrosive or other type of use/environmental conditions that may restrain movement of the hook shaped tab 27.

The configuration of the present invention as above described provides the capability to use a known release lever tool member which can be uniquely utilized to move the hook shaped tab 27 in the direction of the arrow 33 so as to release the latching fingers 21 and 23 from the apertures 25 as well as provide a downward force on the hook shaped tab 27 to move the guide shoe 17 downwardly in the direction of the arrow 39.

Figure 7:
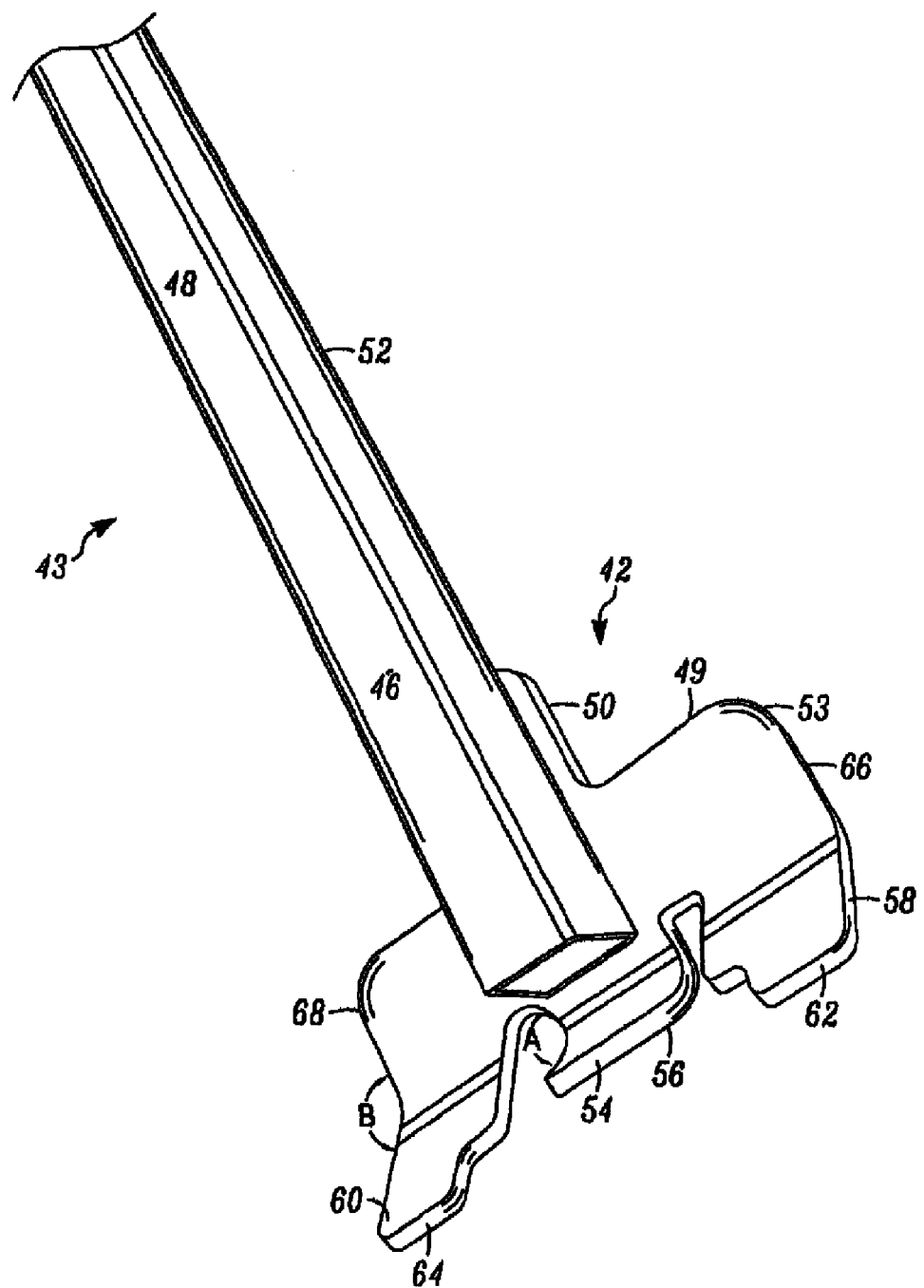
FIGS. 7 and 8 illustrate an engagement head of the tool shown in FIG. 6.
Figure 8:
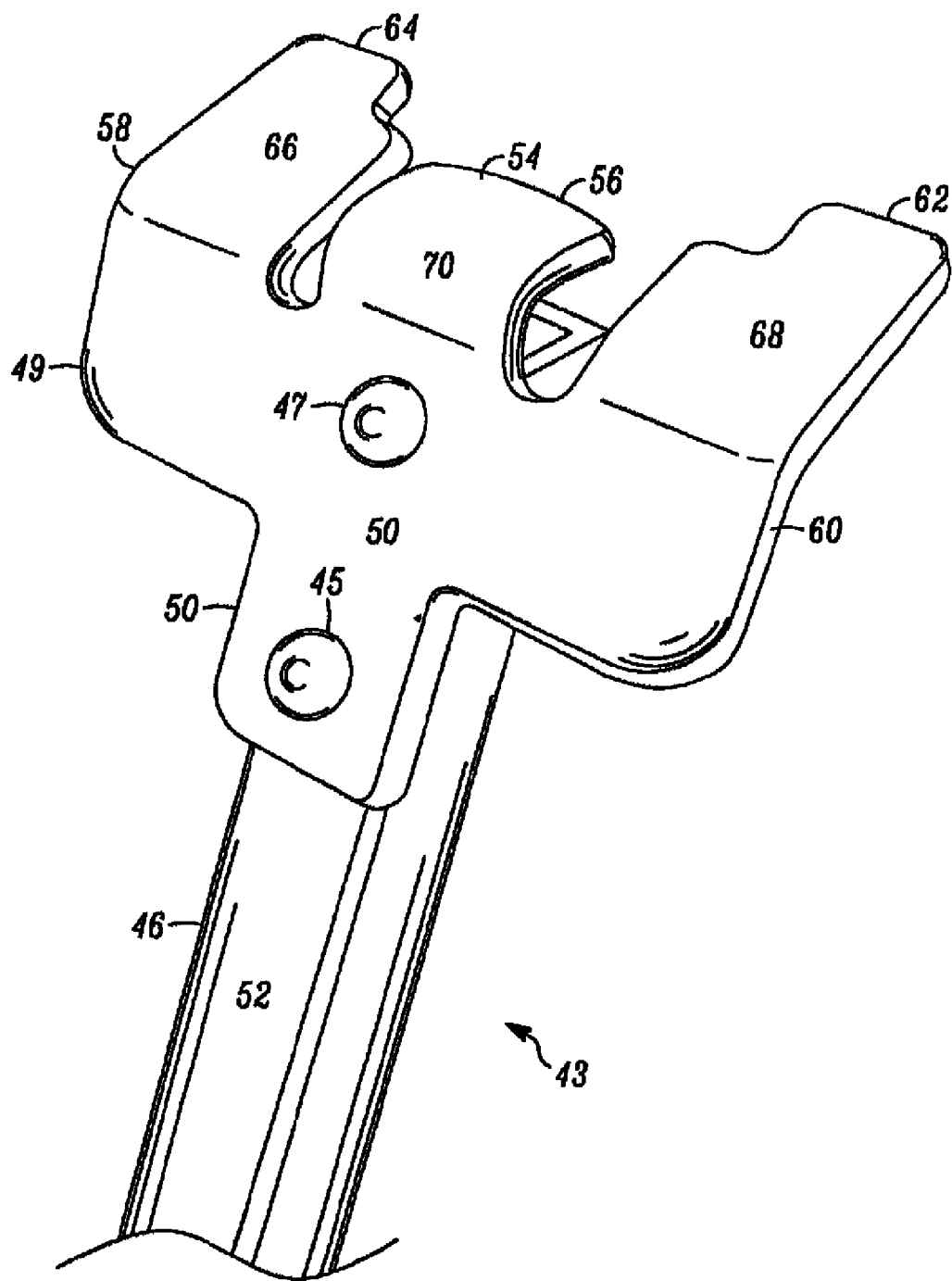

FIGS. 6 through 10 illustrate the tool member 43 and its use in moving the hook shaped tab 27 outwardly as well as providing a downward force thereon. The tool member 43 has an elongated handle 46 with a head end 42 and a remote end 44. An engagement member 49 is connected to by rivets 45 and 47 (FIG. 8) to the head end 42. The elongated handle 46 has an outer surface 48 that is generally planar and an inner surface 52 that is also planar and parallel to the plane of the outer surface 48. The engagement member 49 has a mounting portion 50 that is connected to the inner surface 52 of the handle 46 by the rivets 45 and 47. The engagement member 49 has an engagement portion 53. The engagement portion 53 has a central tab 54 that is bent out of the plane of the inner surface 52 of the handle 48 by a first angle A (FIG. 7). The central tab 54 has a outer end 56.

The engagement portion 53 at the head end 42 of the handle 46 also has a pair of substantially identical spaced apart side arms 58 and 60. The side arm 58 is on one side of the central tab 54 and the side arm 60 is on the opposite side of the central tab 54 so that the central tab 54 is between the two side arms 58 and 60. Each of the side arms 58 and 60 have remote tips 62 and 64 which are bent out of the plane of the inner surface 52 of the handle 46 by a second angle B which is less than the first angle A. The side arms 58 and 60 have bearing surfaces 66 and 68. The central tab 54 has knee portion 70.

Figure 9:
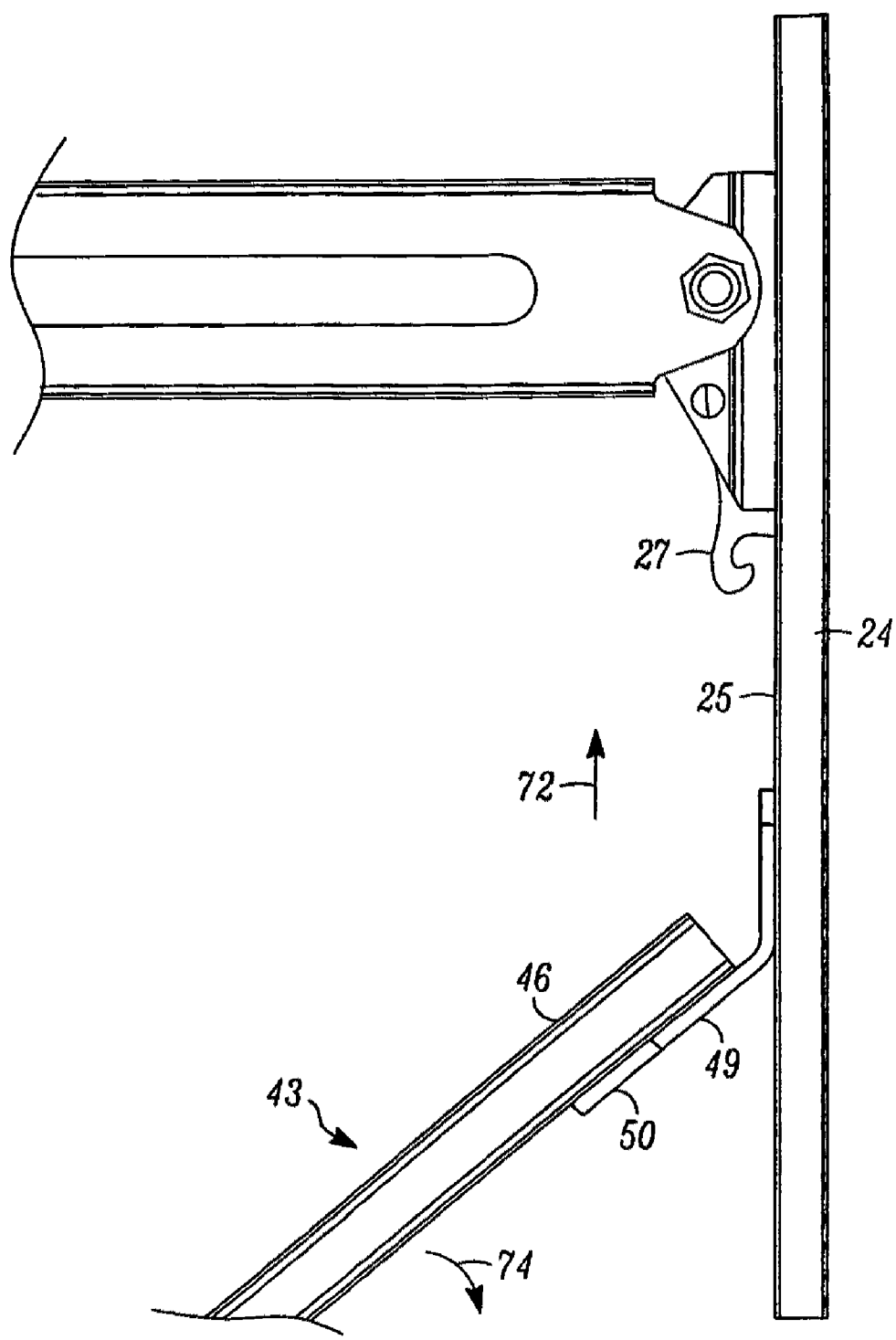
FIG. 9 illustrates the tool of FIG. 6 with the engagement portion sliding on the track and approaching the hook shaped tab of the lock key.

FIG. 9 illustrates the preset invention where the fingers 21 and 22 are in the apertures 25 of the track 24 as illustrated in FIG. 4. If the fingers 21 and 22 were to be stuck or jammed in the apertures 25, the tool member 43 may be conveniently utilized to pry the fingers 21 and 22 out of the apertures 25. As shown on FIG. 9 the end portions of the bearing surfaces 66 and 68 of the side arms 58 and 60 bear against the track 24 and the knee portion 70 of the central tab 54 also bears against the track 24. The tool member 43 is moved upwardly in the direction of the arrow 72 towards the hook shaped tab 27.

Figure 10:
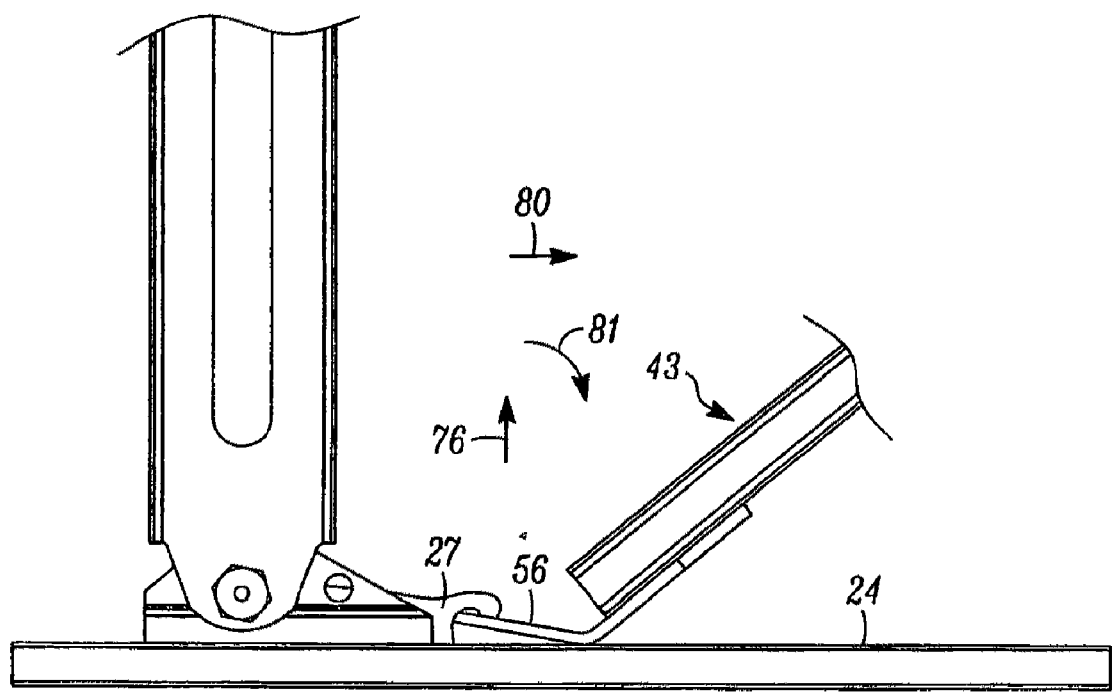
FIG. 10 illustrates the tool of FIG. 6 with the engagement portion on the track and engaging the hook shaped tab of the lock key.

As shown in FIG. 10, the outer or hook engaging end 56 of the central tab 54 moves into a position between the hook shaped tab 27 and the track 24 and the tool member 43 manipulated by rotation in the direction of the arrow 81 towards the track 24 to place the outer end 56 into the open end 40 of the hook shaped tabs 27. Continued rotation of the tool member 43 towards the track 24 moves the hook shaped tab 27 away from the track 24 in the direction of the arrow 76 and removes the fingers 21 and 22 from the apertures 25. If the guide shoe 17 does not move downwardly under the force of gravity, downward force on the hook shaped tab 27 may be applied by moving the tool member downwardly as indicated by the arrow 80 while the hook engaging end 56 of the central tab 54 in the open end 40 of the hook shaped tab 27. The guide shoes are then moved to the desired location on the track 24.

Figure 11:
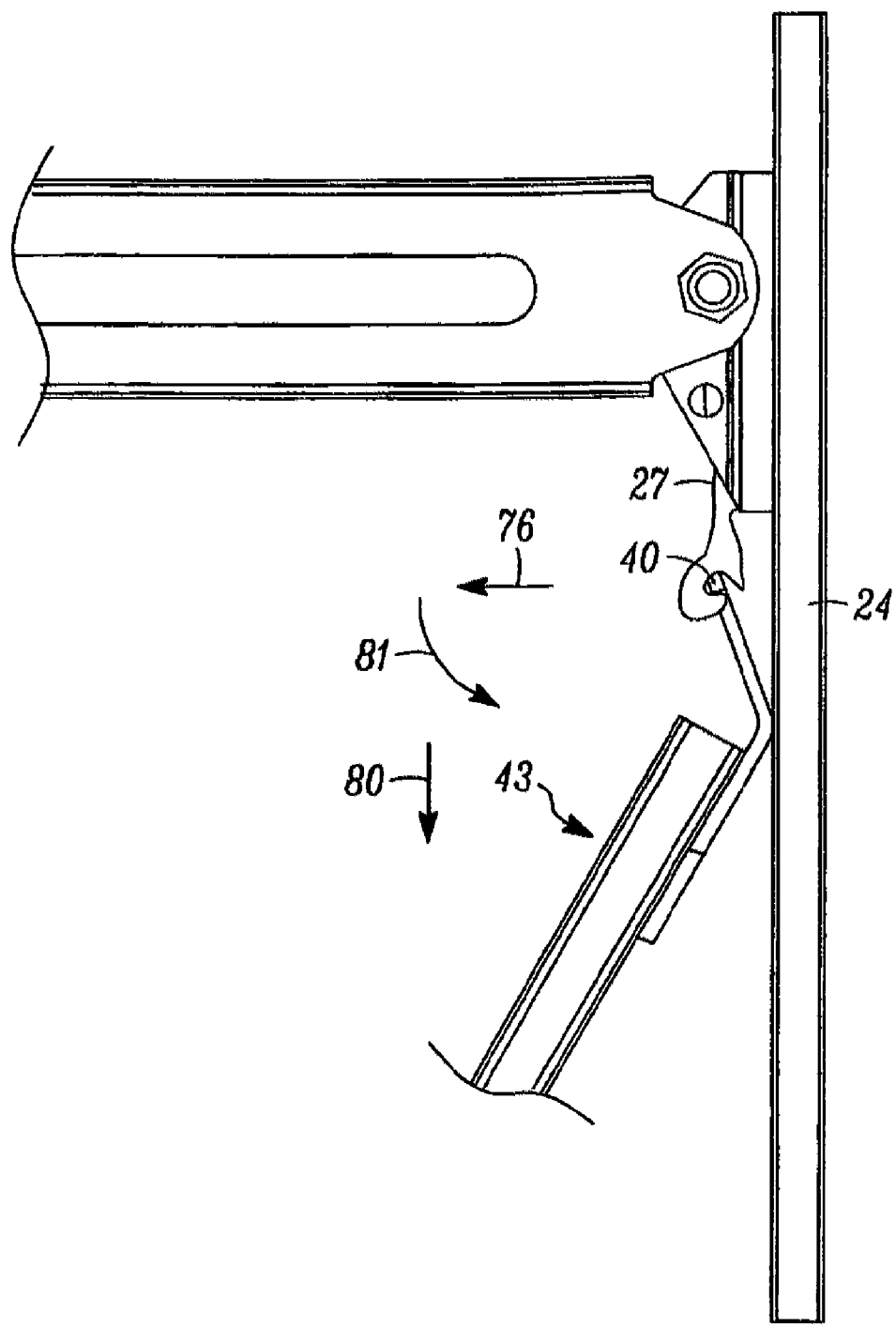
FIG. 11 illustrates another embodiment of the present invention.

Alternatively, in some applications of the present invention it may be desirable to move the hook shaped tabs 27 further away from the track 24 to release the fingers 21 and 22 from the apertures 25 in the track 24. As shown on FIG. 11, the tool member 43 is moved laterally on the track 24 so that one or the other of the remote ends 62 or 64 of the side arms 66 or 68 enter the opening 40 of the hook shaped tab 27. The tool member 43 is then rotated toward the track 24 to move the hook shaped tab 27 outwardly in the direction of the arrow 76 to release the fingers 21 and 22 from the apertures 25 when the hook shaped tab 27 is in the position shown on FIG. 10. If gravity forces on the guide shoe are not sufficient, the tool member 43 then is moved downwardly in the direction of the arrow 80 to move the guide shoe 17 to any desired location on the track 24. The tool member 43 is then rotated away from the track 24 to a position as shown in FIG. 9 to release the hook shaped tab 27 from engagement with the tool member 43 and the fingers 21 and 22 enter the apertures 25 in the new desired location.

Figure 12:
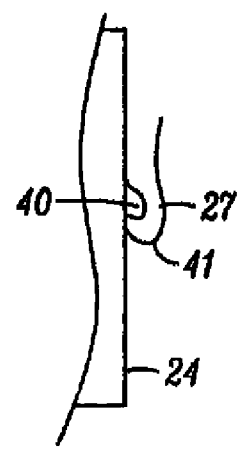
FIG. 12 is a semi-schematic diagram illustrating another embodiment of the present invention.

As shown in FIG. 4, for the embodiment of the present invention illustrated therein, the tip portion 41 of the hook shaped tab 27 is spaced from the track 24 for the condition of the latching fingers 21 and 22 in engagement with the apertures 25. In some embodiments of the present invention, the tip portion 41 of the hook shaped tab 27 may abut against the track 24 for the condition of the latching fingers 21 and 22 in engagement with the apertures 25. This embodiment of the present invention is shown in semi-schematic form FIG. 12. The method of operation to release the latching fingers 21 and 22 from engagement with the apertures 25 the track 24 and to move the guide shoes downwardly is the same as described above, with the central tab 54 moved along the track 24 between the hook shaped tab 27 and the track 24 until the hook engaging end 56 of the central tab 54 moved into a position wherein the hook engaging end 56 of the central tab 54 is placed in the open end 40 of the hook shaped tab 27.

Figure 13:
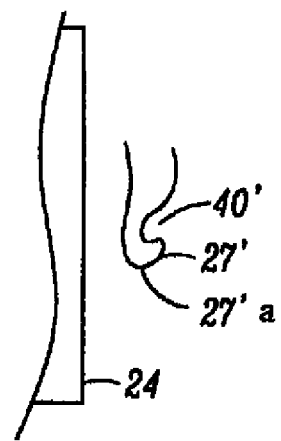
FIG. 13 is a semi-schematic diagram illustrating another embodiment of the present invention; and, FIG. 14 is a semi-schematic diagram illustrating another embodiment of the present invention.
Figure 14:
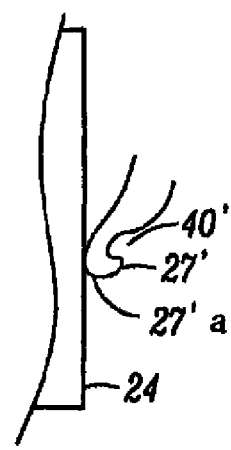

In other embodiments of the present invention, as illustrated in semi-schematic form on FIGS. 13 and 14, there may be a hook shaped tab 27', similar to the hook shaped tab 27, which may have the open end 40' thereof faced away from the track 24 and a heel portion 27' a either spaced from the track 24 (FIG. 13) or abutting thereagainst (FIG. 14) In such embodiments, a separate tool or a separate portion of the tool (not shown) may be required to move the guide shoes downwardly while the latching fingers 21 and 22 are out of engagement with the apertures 25 if it is found that the force of gravity is not sufficient to move the guide shoes downwardly while the hook shaped tab 27' is moved outwardly from the track 24.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. In an adjustable decking system for use in supporting freight in a compartment having opposing walls, such system having a pair of similar tracks with a plurality of spaced apart apertures and, said tracks having side members adjacent sides of said plurality of spaced apart apertures and said tracks being mounted on said opposing walls in directly opposing relationship to each other, and a beam assembly formed by a pair of channel units and a beam member in which the channel units are telescopically supported for slidable longitudinal motion with one end of each of said channel units protruding from opposite ends of the beam member respectively, the improvement comprising, in combination:

a guide shoe pivotally attached to each of the protruding ends of said channel units, each of said guide shoes having a lock key pivotally supported thereon and said guide shoes having a latched position and a sliding position, each of said lock keys having:

a pair of latching fingers extending therefrom which fit into a pair of adjacent ones of said apertures in a respective one of said tracks, said latching fingers being positioned in said pair of apertures for said guide shoes in said latched position thereof and said latching fingers free of engagement with said pair of apertures for said guide shoes in said sliding position, said beam assembly being selectively adjustable in height along said opposing tracks by slidably positioning said guide shoes along said tracks for said guide shoes in said sliding position to bring said latching fingers of said lock keys into engagement with a selected a pair of said opposing track apertures at a preselected height on said respective track; and, a hook shaped tab on each of said lock keys and each of said hook shaped tabs having a hook opening, a heel portion and a hook tip portion;

a biasing spring for resiliently urging said lock keys toward said respective track to position said latching fingers in said track apertures and resisting movement of said lock keys away from said track.

2. The arrangement defined in claim 1 wherein:

said hook opening of said hook shaped tab faces said respective track; and said hook tip portion of said hook shaped tab is closely adjacent said track for a condition of said latching fingers in said respective apertures of said track.

3. The arrangement defined in claim 1 wherein:

said hook opening of said hook shaped tab faces said respective track; and said hook tip portion of said hook shaped tab touches said track for a condition of said latching fingers in said respective apertures of said track.

4. The arrangement defined in claim 1 wherein:

said hook opening of said hook shaped tab faces away from said respective track; and said heel portion of said hook shaped tab touches said track for a condition of said latching fingers in said respective apertures of said track.

5. The arrangement defined in claim 1 wherein:

said hook opening of said hook shaped tab faces toward said respective track; and said heel portion of said hook shaped tab touches said track for a condition of said latching fingers in said respective apertures of said track.

6. The arrangement defined in claim 1 and further comprising:

a tool member having an elongated handle having head end and a remote end;

an engagement member coupled to said head end of said tool member and said engagement member slidingly movable along a respective one of said tracks and positionable between said hook shaped tabs and said track, and said engagement member having a central tab for engaging said hook shaped tabs to move said hook shaped tabs in a first direction away from said track to move said latching fingers out of said apertures in said track.

7. The arrangement defined in claim 6 and further comprising:

said central tab for engaging said hook shaped tabs to move said hook shaped tabs in a second direction to move said guide shoes downwardly on said track for a condition of said latching fingers out of engagement with said respective apertures in said track.

8. The arrangement defined in claim 2 and further comprising:

a tool member having an elongated handle having head end and a remote end;

an engagement member coupled to said head end of said tool member and said engagement member slidingly movable along a respective one of said tracks and positionable between said hook shaped tabs and said track, and said engagement member having a central tab for engaging said hook shaped tabs to move said hook shaped tabs in a first direction away from said track to move said latching fingers out of said apertures in said track.

9. The arrangement defined in claim 8 and further comprising:

said central tab for engaging said hook shaped tabs to move said hook shaped tabs in a second direction to move said guide shoes downwardly on said track for a condition of said latching fingers out of engagement with said respective apertures in said track.

10. The arrangement defined in claim 3 and further comprising:

a tool member having an elongated handle having head end and a remote end;

an engagement member coupled to said head end of said tool member and said engagement member slidingly movable along a respective one of said tracks and positionable between said hook shaped tabs and said track, and said engagement member having a central tab for engaging said hook shaped tabs to move said hook shaped tabs in a first direction away from said track to move said latching fingers out of said apertures in said track.

11. The arrangement defined in claim 10 and further comprising:

said central tab for engaging said hook shaped tabs to move said hook shaped tabs in a second direction to move said guide shoes downwardly on said track for a condition of said latching fingers out of engagement with said respective apertures in said track.

12. The arrangement defined in claim 4 and further comprising:

a tool member having an elongated handle having head end and a remote end;

an engagement member coupled to said head end of said tool member and said engagement member slidingly movable along a respective one of said tracks and positionable between said hook shaped tabs and said track, and said engagement member having a central tab for engaging said hook shaped tabs to move said hook shaped tabs in a first direction away from said track to move said latching fingers out of said apertures in said track.

13. The arrangement defined in claim 5 and further comprising:

a tool member having an elongated handle having head end and a remote end;

an engagement member coupled to said head end of said tool member and said engagement member slidingly movable along a respective one of said tracks and positionable between said hook shaped tabs and said track, and said engagement member having a central tab for engaging said hook shaped tabs to move said hook shaped tabs in a first direction away from said track to move said latching fingers out of said apertures in said track.

\* \* \* \* \*